United States Patent [19]
Sundberg et al.

[11] Patent Number: 5,503,411
[45] Date of Patent: Apr. 2, 1996

[54] TRICYCLE/ROCKER COMBINATION

[75] Inventors: Brian C. Sundberg, Franklin; Michael S. Bernstein, Natick; Edward C. Owen, New Bedford, all of Mass.

[73] Assignee: Safety 1st, Inc., Chestnut Hill, Mass.

[21] Appl. No.: 407,200

[22] Filed: Mar. 20, 1995

[51] Int. Cl.⁶ .................................................. B62K 13/00
[52] U.S. Cl. ...................... 280/1.188; 280/7.17; 280/30; 280/62; 280/282
[58] Field of Search .................. 280/828, 1.182, 280/1.188, 7.1, 7.12, 7.14, 7.15, 7.17, 8, 9, 10, 30, 32, 62, 282

[56] References Cited

U.S. PATENT DOCUMENTS

| | | | |
|---|---|---|---|
| 967,641 | 8/1910 | Joseph | 280/1.188 |
| 2,499,531 | 3/1950 | Sever | 280/7.17 |
| 4,958,842 | 9/1990 | Chang | 280/30 X |

FOREIGN PATENT DOCUMENTS

| | | | |
|---|---|---|---|
| 991009 | 9/1951 | France | 280/1.188 |

Primary Examiner—Kevin T. Hurley
Attorney, Agent, or Firm—Wolf, Greenfield & Sacks

[57] ABSTRACT

A rocker/tricycle combination toy is provided that can be used as either a rocking toy for children or a conventional tricycle. A tricycle can detachably connect to a rocking base so that a child can sit on the tricycle and rock back and forth. The rocking base is curved about a transverse axis for allowing rocking motion in a longitudinal direction. The tricycle is connected to the base through a support that includes a locking post that engages a socket provided in the underside of the tricycle. The rocking base can include troughs for receiving the rear wheels of the tricycle to retain the tricycle in alignment with the base. The rocking base can also include a trough for receiving the front wheel of the tricycle that allows a child to pedal the front wheel when the tricycle is mounted on the base. In another embodiment, the trough for receiving the front wheel can be configured to allow a child to steer the front wheel when the tricycle is mounted on the base.

13 Claims, 5 Drawing Sheets

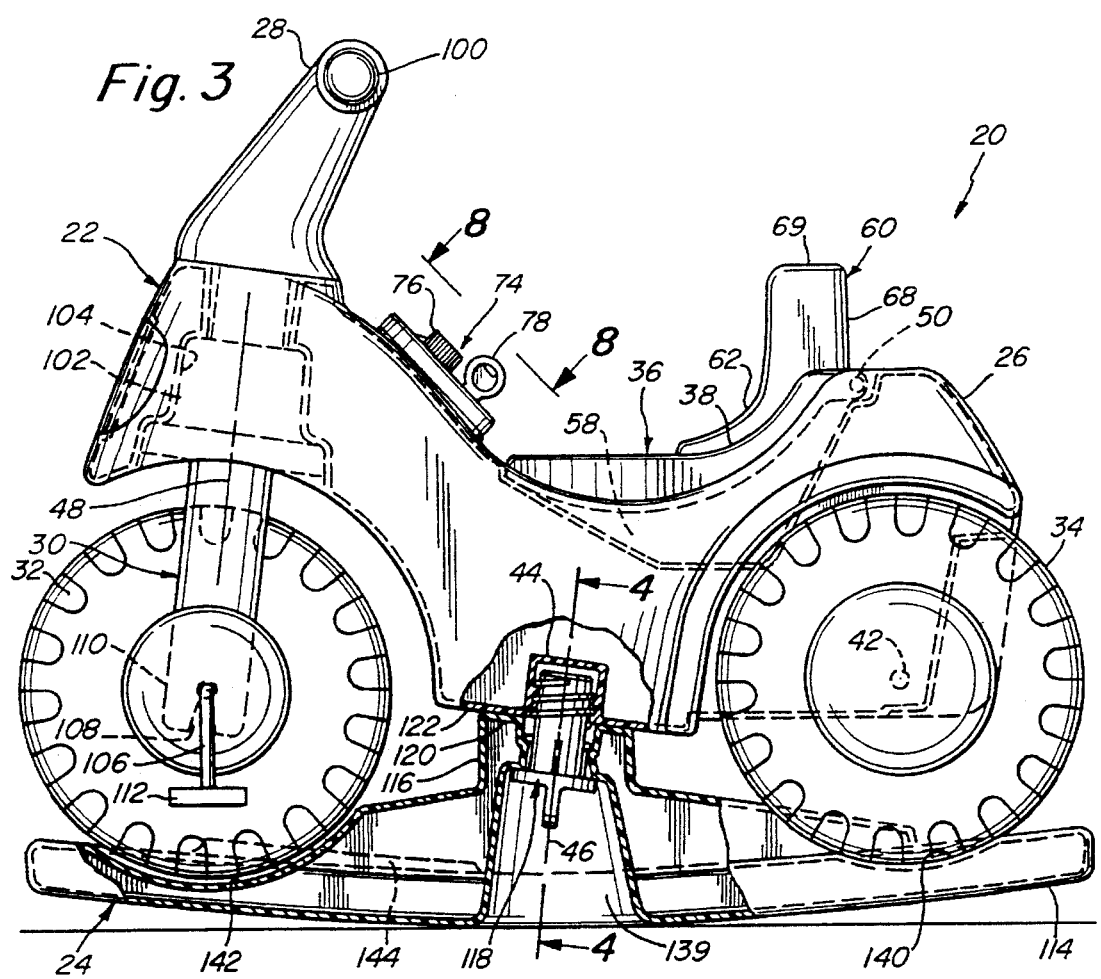
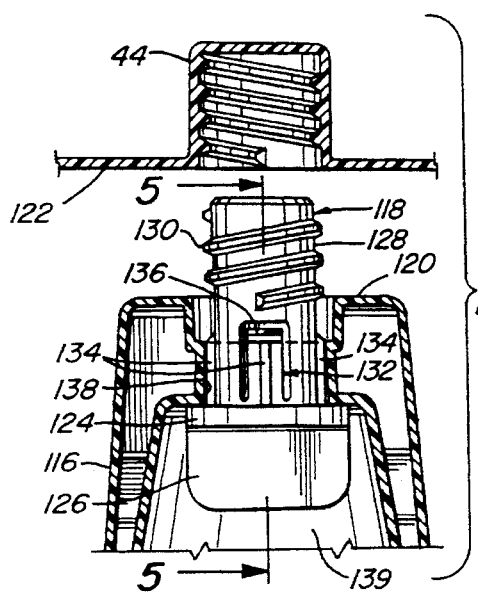
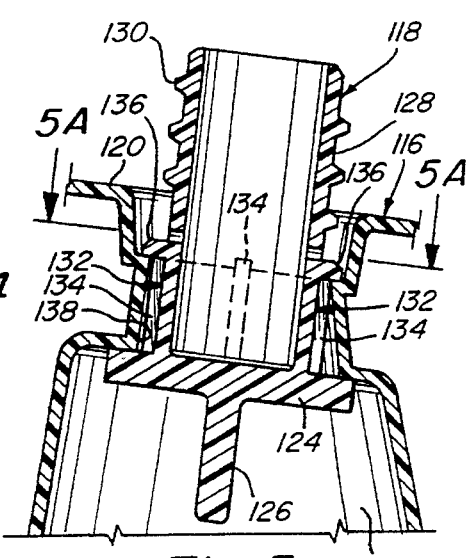

TRICYCLE/ROCKER COMBINATION

FIELD OF THE INVENTION

The present invention relates to a combination rocking and riding toy for children. More particularly, the present invention is directed to a tricycle/rocker combination toy that includes a tricycle that either attaches to a rocking base for use as a rocking toy or detaches from the rocking base for use as a conventional tricycle.

BACKGROUND OF THE INVENTION

Rocking type toys for children have been known for many years. One of the more notable of these toys is the "hobby horse" that includes a toy horse mounted on rockers. A child can sit on the horse and cause it to rock back and forth using body movement. Many of these toys, however, including the hobby horse, can be used only as a rocking toy. Generally, children become bored with rocking toys after using them over a period of time, particularly as a child grows older. Improvements have been made in the field to increase the versatility of rocking toys to maintain a child's interest in these toys over a longer period of time. For example, rocking toys have been developed that are convertible from a rocking toy to a toy that can roll across the ground or floor.

U.S. Pat. No. 3,161,417 shows a convertible hobby horse that has wheels at the base of each leg so that a toddler can propel the horse across the floor while riding the horse. Alternatively, the hobby horse can be mounted on rocker elements to convert it to a rocking horse. Similarly, U.S. Pat. No. 1,478,449 shows a rocking horse that can be removed from the rocker base and moved across the floor on a wheeled platform that attaches to the rocker base. U.S. Pat. Nos. 3,848,869 and 2,716,439 are examples of convertible rocking toys that incorporate retractable wheels so that they can be converted from a rocking toy to a wheeled toy.

An object of the present invention is to provide a combination rocking toy and tricycle that can be detached from a rocking base and used as a conventional tricycle.

SUMMARY OF THE INVENTION

One illustrative embodiment of the invention is a rocker-tricycle combination having features that include a rocking base, a support located on the base and a tricycle detachably connected to the base through the support. The rocking base has a curved base plate that allows a rocking motion. A child can sit on the tricycle and rock back and forth when the tricycle is attached to the base. Further, the tricycle detaches from the base for use as a conventional tricycle.

The invention also encompasses a riding toy having features that include a rocking base, a pedestal located on the base, a rolling toy and a connecting device for attaching the rolling toy to the base through the pedestal. The rocking base is curved about a transverse axis for permitting a front and back rocking motion on a supporting surface. The rolling toy has a frame, a handlebar and at least three wheels. The toy is detachably supported on the base so that the wheels do not contact the supporting surface. The riding toy also includes a socket in the lower portion of the frame for aligning with the pedestal and mounting the toy to the base.

Numerous other objects and features of the invention should become apparent upon a reading of the following detailed description taken in conjunction with the accompanying drawings.

BRIEF DESCRIPTION OF THE DRAWINGS

FIG. 3 is a left side elevational view of the embodiment of the tricycle/rocker combination shown in FIGS. 1 and 2;

FIG. 4 is a cross-sectional view taken along section line 4—4 of FIG. 3 showing the locking mechanism in the detached mode used to connect the tricycle to the rocking base;

FIG. 5 is an enlarged cross-sectional view of a part of the locking mechanism taken along section line 5—5 of FIG. 4;

DETAILED DESCRIPTION OF THE INVENTION

Figure 1:
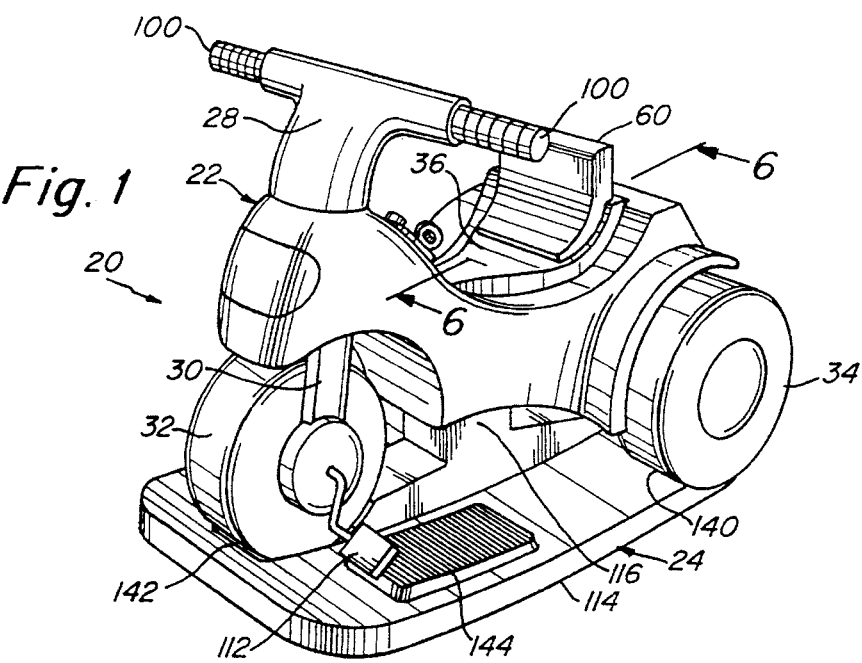
FIG. 1 is a perspective view of an embodiment of a tricycle/rocker combination according to the present invention.
Figure 2:
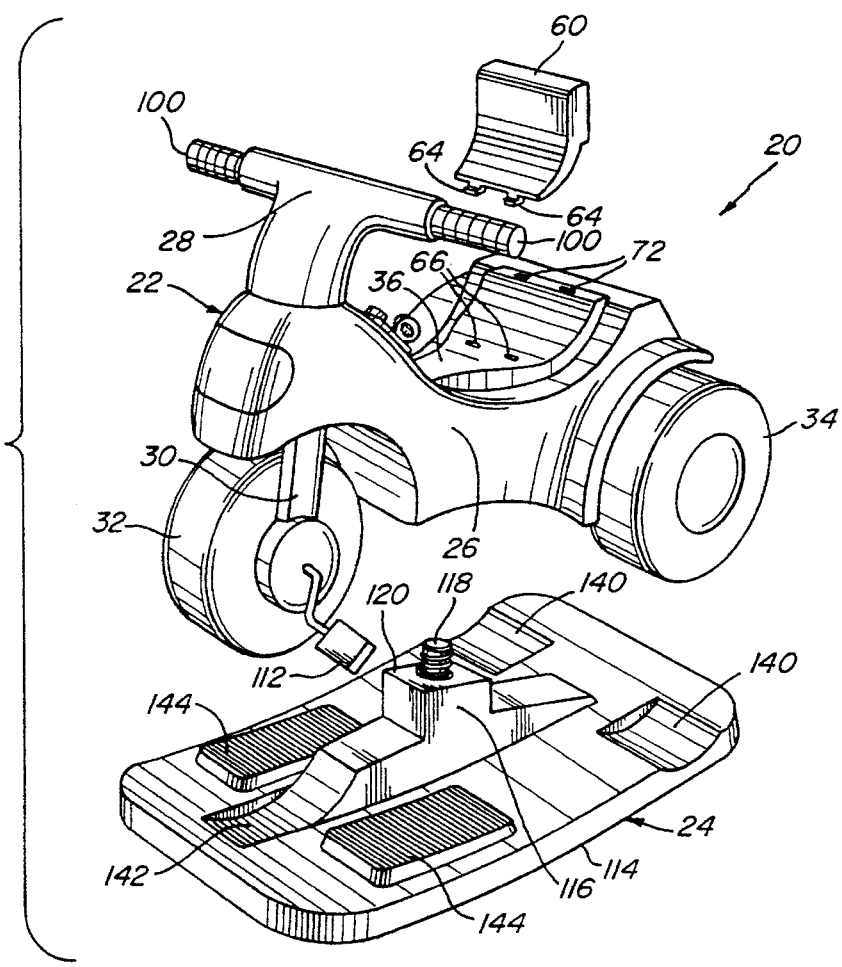
FIG. 2 is a perspective, partially exploded view of the embodiment shown FIG. 1.

The present invention is directed to a child's tricycle/rocker combination toy, an illustrative embodiment of which is shown in FIGS. 1–2. Referring to FIG. 1, the tricycle/rocker 20 is shown in the rocker mode wherein a tricycle 22 is secured to a rocking base 24. A child can sit on the tricycle 22 and cause a longitudinal back and forth rocking motion using body movements similar to playing with common rocking toys. When the tricycle 22 is removed from the rocking base 24 as illustrated in FIG. 2, a child can propel the tricycle 22 across a surface in the same manner as any conventional tricycle that children enjoy riding today.

Referring to FIG. 3, the tricycle 22 includes a plastic hollow frame 26, a handlebar 28, a front fork 30, a front wheel 32, two rear wheels 34 and a seat 36. The front wheel 32 is rotatably attached to the front fork 30. The front fork 30 is connected to the handlebar 28 allowing a child to steer the front wheel 32 by rotating the handlebar 28. The front fork 30 extends downwardly from the front portion of the frame 22. The rear wheels 34 are rotatably mounted to the lower rear portion of the frame 22 on a metal axle 42 that transversely extends through the frame 22.

The frame 22 should be both light weight and rugged enough to withstand the abuse commonly imposed upon children's toys. Preferably, the frame 22 is one piece and blow molded from a plastic material such as high density polyethylene (HDPE) that provides strength and rigidity. The frame 22 can be molded into various shapes and configurations to suit particular consumer tastes. As shown in this particular embodiment, the frame 22 can have an appearance similar to an All Terrain Vehicle (ATV).

Referring to FIGS. 3 and 4, a threaded socket 44 is integrally molded in the bottom portion of the frame 22. The socket 44 is used to releasably attach the tricycle 22 to the rocking base 24. As illustrated, the socket 44 is molded so that its axis 46 is generally parallel to the axis 48 of the front fork 30 to reduce the complexity of the blow molding process. In this illustrative embodiment, the axes are angled approximately 8° from the vertical.

Figure 6:
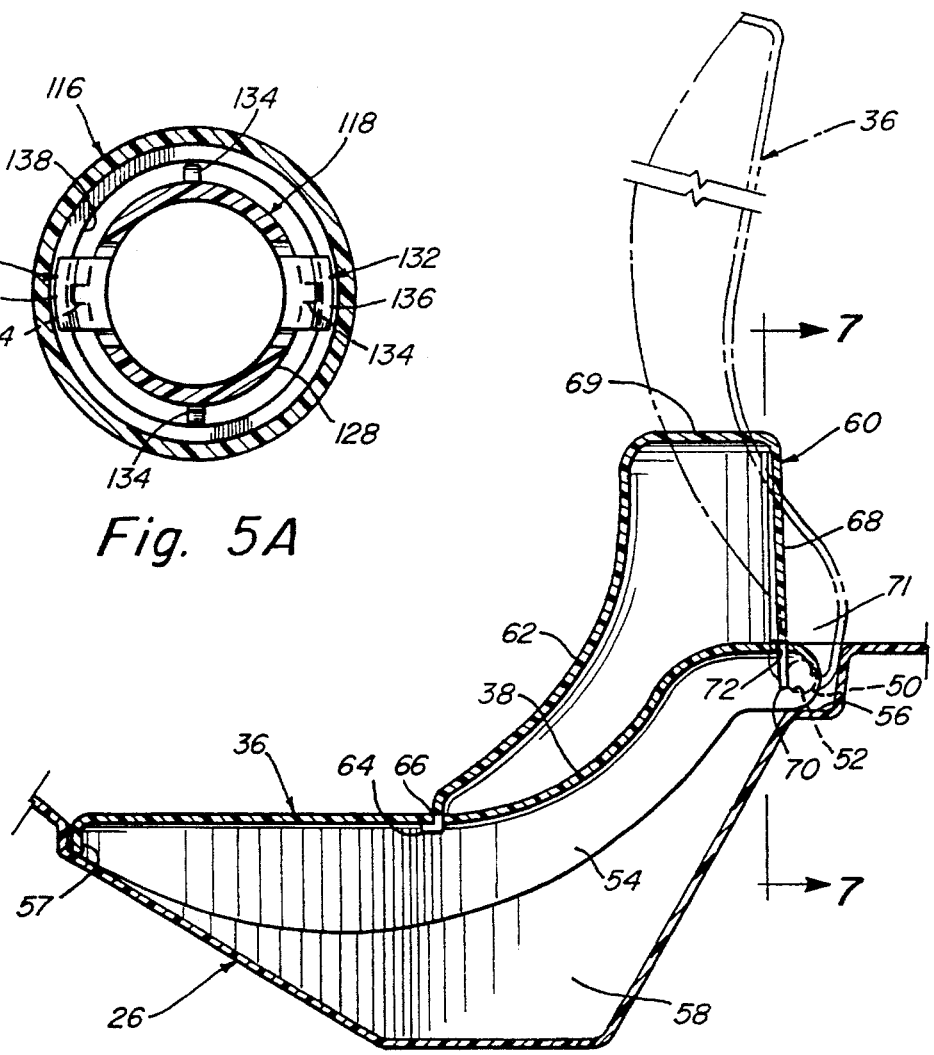
FIG. 6 is a cross-sectional view taken along section line 6—6 of FIG. 1, illustrating the seat in multiple positions.
Figure 7:
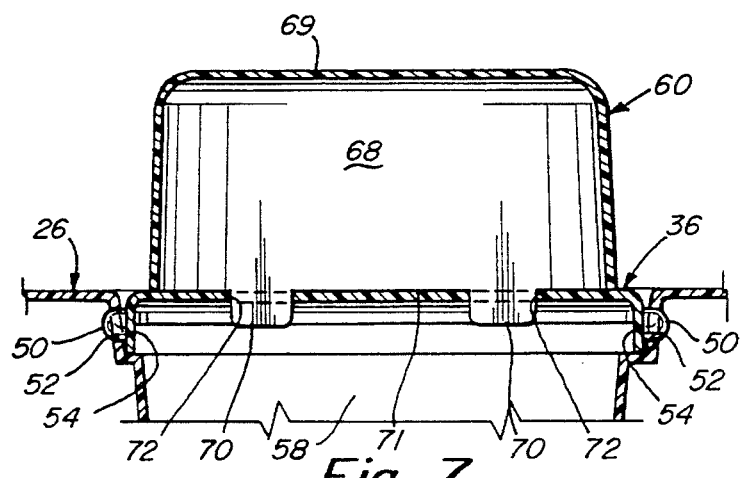
FIG. 7 is a cross-sectional view taken along section line 7—7 of FIG. 6 illustrating the seat connection to the tricycle frame and the seat back connection to the seat.

The illustrated embodiment shows the seat 36 as generally banana shaped with its upper surface 38 curving upwardly from the front toward the rear. Referring to FIGS. 6–7, the seat 36 is pivotally mounted to the rear upper portion of the frame 26. Hinge pins 50 are integrally molded on opposite rear sides of the seat 36. The seat 36 is snap-assembled to the frame 26 by inserting the hinge pins 50 into pivot holes 52 formed in the frame 26. When in the down position for supporting a child, the seat sides 54 rest on a ledge 56 formed in the rear of a cavity 58 in the frame 26. The front edge 57 of the seat rests on the front portion of the cavity 58. The cavity 58 can be used as a storage area for holding a child's necessities. Access to the storage area 58 is gained by pivoting the seat 36 to an upright position. The seat 36 is preferably injection molded from a plastic material such as polypropylene.

A removable seat back 60 can be attached to the seat to support a smaller child on the tricycle 22. The seat back 60 is formed with a concave surface 62 for comfortably supporting a child's back. Two hook tabs 64 are formed at the base of the concave surface 62 and extend into forward slots 66 provided on the upper surface 38 of the seat 36 as shown in FIG. 2. The seat back 60 also includes a generally vertical rear wall 68 extending downwardly from a generally horizontal upper wall 69 that connects the rear wall 68 to the rear portion of the concave surface 62. The rear wall 68 is formed with straight tabs 70 extending downwardly from its bottom edge 71. The straight tabs 70 can be inserted into rear slots 72 provided on the seat 36. Preferably, the seat back 60 is injection molded from a plastic material such as polypropylene.

The seat back 60 can be removed from the seat 36 by lifting and pivoting the rear wall 68 around the hook tabs 64 so that the straight tabs 70 are withdrawn from the rear slots 72 on the seat 36. The seat back 60 is pivoted further around the hook tabs 64 until the tabs 64 are aligned with and can be withdrawn from the front slots 66 allowing the removal of the seat back 60. A detent (not shown) can be formed on the straight tabs 70 for securing each tab 70 in the rear slots 72.

Figure 8:
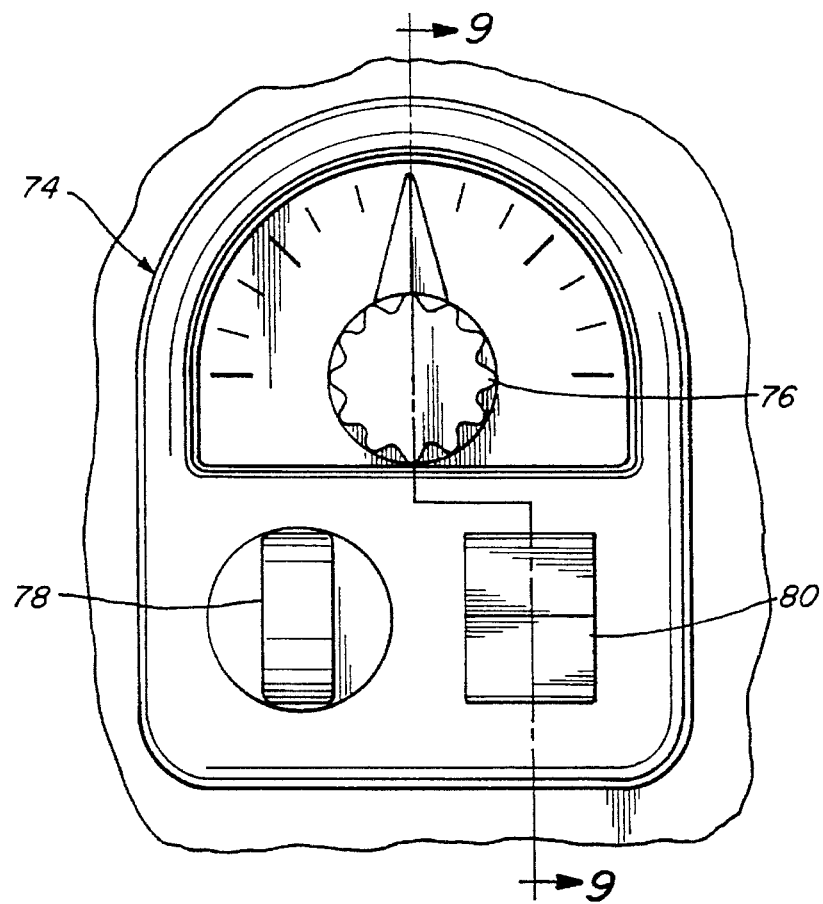
FIG. 8 is a plan view taken along view line 8—8 of FIG. 3 illustrating the activity control panel of the combination tricycle/rocker.

For added enjoyment, the tricycle includes an activity control panel 74 located on the upper portion of the frame 26 between the handlebar 28 and the seat 36 within easy reach of a sitting child. Preferably, the activity center is a subassembly of various interactive devices, that snaps into a hole formed in the frame 26. Referring to the illustrative embodiment shown in FIGS. 8 and 9, the activity center 74 can include a rotatable dial 76, a rotatable key 78, and a toggle type push button 80. Rotation of both the dial 76 and key 78 in either direction generates a clicking sound to encourage the child to interact with these devices. The dial 76 can rotate approximately 180° and the key 78 can rotate 360°. The push button 80 makes a beeping sound when the child presses and releases the button. Various labels or markings can be applied to the activity center so a child can pretend the devices perform functions such as a speedometer or ignition switch.

Figure 9:
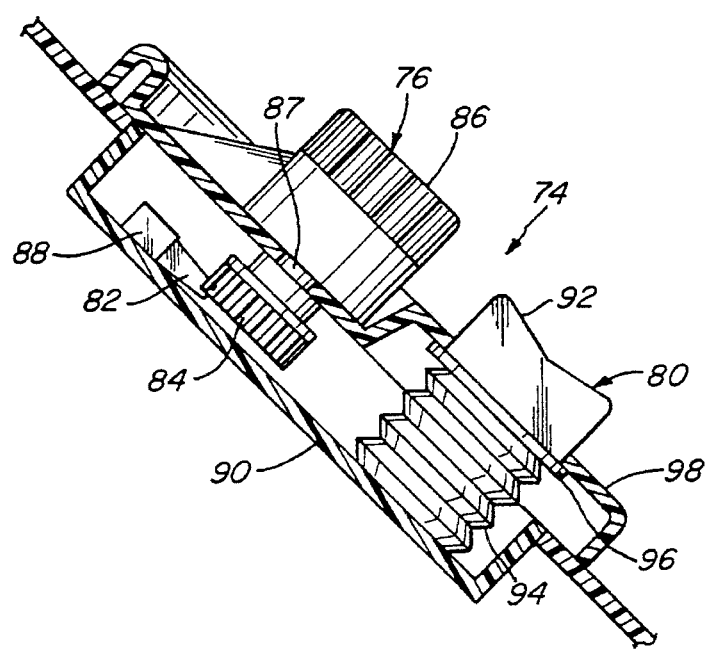
FIG. 9 is a cross-sectional view taken along section line 9—9 of FIG. 8.

As illustrated in FIG. 9, the dial 76 generates the clicking sounds using a cantilevered pick 82 that engages a gear 84 which in turn is rotatably coupled by means of shaft 87 to a knob 86 that a child can grasp and rotate. Rotating the gear 84 causes the pick 82 to ride over the teeth of the gear 84 and generate a clicking noise which entertains the child. The pick 82 is cantilevered from an anchor base 88 that is attached to the control panel back wall 90.

The toggle type push-button 80 includes a cap 92 and bellows 94. The base of the cap 92 is formed with a flange 96 around its perimeter. The flange 96 engages the underside of the activity center cover 98 to retain the cap 92 on the activity center 74 while resisting the expansion of the bellows 94. The cap 92 is preferably injection molded from a plastic material such as polypropylene. The bellows 94 includes a reed (not shown) that squeaks when air passes through it caused by the compression and expansion of the bellows. The bellows 94 is positioned within the control panel 74 between the back wall 90 and the base flange 96 of the cap 92. A child can press the cap 92 causing the bellows 94 to compress thereby expelling air through the reed generating a beeping sound. The bellows 94 expands and reinflates when the child releases the cap 92. The bellows 94 is preferably blow molded from a plastic material such as polyethylene.

Figure 11:
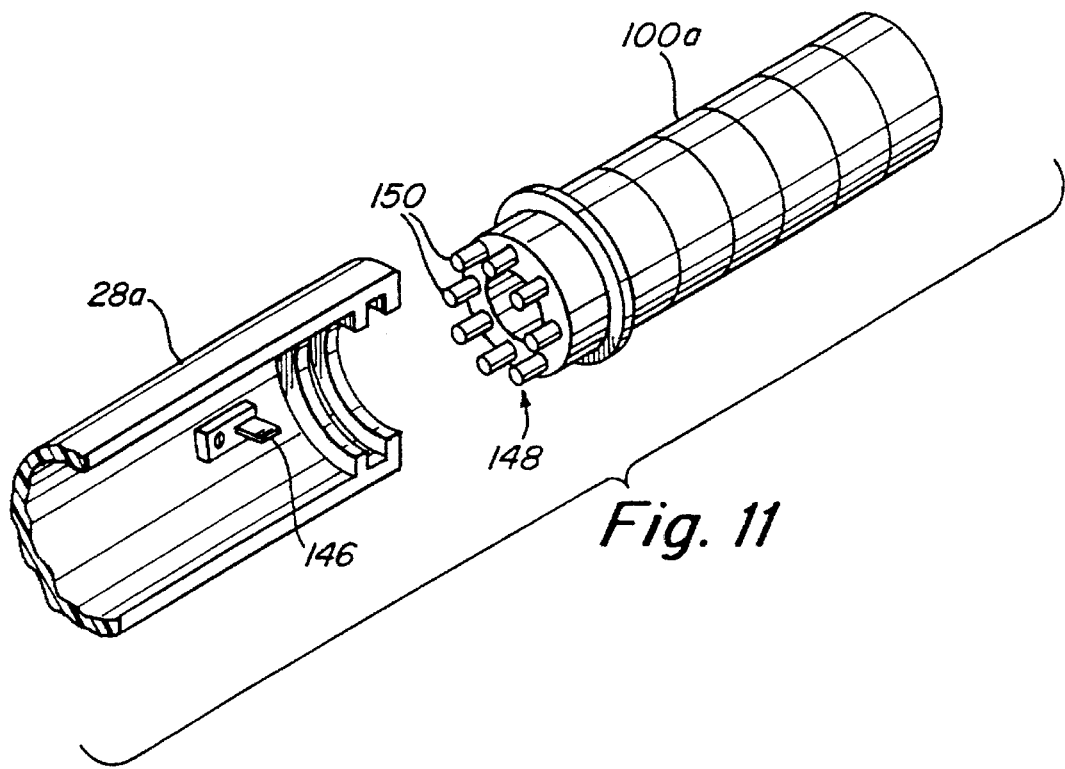
FIG. 11 is a fragmentary perspective view of an embodiment of a noise generating handgrip.

Referring to FIGS. 2–3, the handlebar 28 is preferably assembled from two pieces, a front piece and a rear piece (not shown), that can snap together or be fastened together using fastening devices such as screws. When the front and rear pieces are assembled, they capture handgrips 100 that extend from each end of the handlebar 28. The handgrips 100 are captured in a fixed position within the handlebar 28. As shown in FIG. 11, however, the handgrips 100a can be rotatably captured in the handlebar 28a so that the child can rotate the handgrips 100a to create clicking noises which encourage additional interaction with the toy. The rotatable handgrips 100a use a pick 146 and gear 148 arrangement where the pick 146 rides over the gear teeth or pins 150 as the handgrip 100a is rotated to generate the clicking noises. Preferably, the handlebar pieces and handgrips 100 are injection molded from a plastic material such as polypropylene.

The front fork 30 is also preferably assembled from two pieces, a left piece and a right piece (not shown), that snap together. The upper end 102 of the front fork 30 is bell shaped with the lower portion of the bell of larger diameter than the upper portion. The front fork 30 is inserted from below the frame 26 upwardly into a matching bell-shaped cavity 104 in the frame. This configuration acts as a bearing to provide two primary functions. First, forces exerted on the front fork 30 are distributed to the frame 26 through the interface between the upper end 102 of the fork 30 and the bell cavity 104. Second, the bell cavity 104 allows the front fork 30 to rotate within the frame 26. A child can rotate the front fork 30 by steering the handlebar 28 which is connected to the front fork 30 within the frame 26. Preferably, the front fork pieces are injection molded from a plastic material such as acrylonitrile butadiene styrene (ABS) that has tough rigid properties.

The front wheel 32 is rotatably connected to the lower end 110 of the front fork 30. A wheel crank 106 is connected to the front wheel 32 in a manner generally known within the art. The wheel crank 106 is snap-connected into v-shaped slots 108 in the lower end 110 of the fork. Pedals 112 are rotatably connected to each side of the wheel crank 106 in a manner generally known in the art.

Referring again to FIGS. 2–3, the rocking base 24 includes a base plate 114, a pedestal 116 and a locking connector 118. The base plate 114 is curved around a transverse axis so that the base 24 can rock back and forth in the longitudinal direction. Preferably, the base plate 114 and pedestal 116 are formed together as a one piece blow molded part from a plastic material such as HDPE.

The pedestal 116 is located approximately in the center of the base plate 114. The pedestal 116 functions as a support for the tricycle 22 when it is attached to the rocking base 24 in the rocking mode. The pedestal 116 includes a support surface 120 that is elevated above the base plate 114. The support surface 120 engages the bottom surface 122 of the tricycle frame 26 in the rocking mode. Preferably, the support surface 120 and the bottom surface 122 of the tricycle 22 are angled so that they are generally perpendicular to the axis 46 of the threaded socket 44 in the lower portion of the tricycle 22.

Figure 5A:
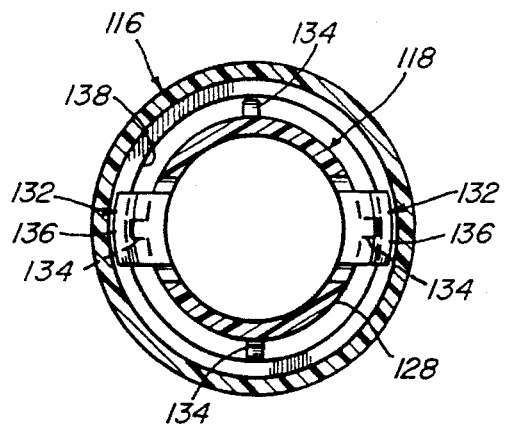
FIG. 5A is a cross-sectional view taken along section line 5A—5A of FIG. 5 illustrating the centering and locking features of the locking connector.

The locking connector 118 is rotatably attached to the pedestal 116 for securing the tricycle 22 to the rocking base 24. As illustrated in FIGS. 4, 5 and 5A, the locking connector 118 includes a base 124, a handle 126 and a locking post 128. The handle 126 extends down from and generally perpendicular to the base 124. The handle is generally rectangular and a person can comfortably grasp it to rotate the locking connector 118. The locking post 128 is a hollow cylindrical member extending upwardly from and generally perpendicular to the base 124. The upper portion of the locking post 128 carries threads 130 that engage the socket 44 in the tricycle 22. The lower portion of the locking post 128 includes locking members 132 and centering ribs 134 that are diametrically opposed to each other. The locking members 132 are cantilevered from the base 124 and have a locking tab 136 that extends radially outward from the free end of the locking member 132 so that the tab 136 is generally parallel to the base 124. Each locking member 132 also has a centering rib 134 extending longitudinally from the locking tab 136 down toward the base 124. Two additional centering ribs 134 are located on diametrically opposed sides of the locking post 128 that are offset approximately 90° from the centering ribs on the locking members 132. The locking connector 118 preferably is formed by injection molding a plastic material such as polypropylene.

As illustrated in FIGS. 3–5, the locking connector 118 is attached to the pedestal 116 by inserting the connector 118 up through a cavity 139 formed in the bottom of the base plate 114. The cavity 139 is sized so that an adult can easily grasp the locking connector 118 after it is attached to the pedestal 116. The locking members 132 are deflected inwardly into the locking post 128 so that the locking tabs 136 can pass through an elongated, reduced diameter orifice 138 formed in the upper portion of the pedestal 116. When the locking connector 118 is fully inserted into the pedestal 116, the locking tabs 136 are positioned above the orifice 138 so that the locking members 132 can return to their undeflected position. The locking connector 118 is now rotatably attached to the pedestal 116 wherein the base 124 engages the lower end of the orifice 138 and the locking tabs 136 engage the upper end of the orifice 138 minimizing the axial movement of the locking connector 118. The centering ribs 134 engage the orifice wall minimizing the radial movement of the locking connector 118 within the orifice 138. Furthermore, the reduced contact surface area lowers the friction between the locking connector 118 and the orifice wall thereby allowing the connector 118 to easily rotate in either direction. The upper threaded portion of the locking post 128 extends above the support surface 120 to screw into the socket 44 in the tricycle 22.

Figure 10:
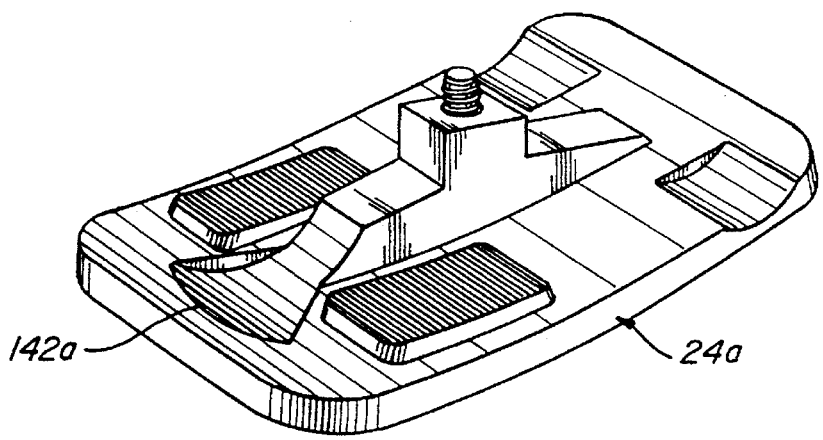
FIG. 10 is a perspective view of an alternative embodiment of the rocking base.

Referring to FIGS. 2–3, the base plate 114 is formed with two rear troughs 140 and a front trough 142 that are used to align and secure the tricycle 22 on the rocking base 24 in the rocking mode. The troughs 140–142 are radially shaped to conform to the shapes of the front and rear wheels 32–34. As illustrated in FIG. 3, the rear wheels 34 engage the rear troughs 140 so that a child's weight is transferred to the rocking base through both the pedestal 116 and the rear wheels 34. The front wheel 32, however, is maintained approximately ⅛ of an inch above the front trough 142 so that a child can pedal and rotate the front wheel 32 while sitting on the tricycle in the rocking mode. In the embodiment illustrated in FIGS. 1–2, the width of the front trough 142 prevents the front wheel from being steered by a child. In another embodiment of the rocking base 24a as shown in FIG. 10, however, the front trough 142a can be shaped to allow a child to both pedal and steer the front wheel 32 while sitting on the tricycle 22 in the rocking mode.

As illustrated in FIGS. 1–2, the rocking base 24 also includes foot pads 144 located on the upper surface of the base plate 114, below and to the rear of the pedals 112 on the tricycle 22. The foot pads 144 can be integrally molded on the rocking base 24 with a ribbed upper surface that provides traction for a child's feet. The foot pads 144 present a child with an alternative location to rest its feet other than on the pedals 112 when the tricycle 22 is used in the rocking mode.

Having described an illustrative embodiment of the invention in detail, those skilled in the art will appreciate that numerous modifications may be made to this embodiment without departing from the spirit of the invention. Therefore, it is not intended that the breadth of this invention be limited to the specific embodiment illustrated and described. Rather, the breadth of the invention is to be determined by the appended claims and their equivalents.

What is claimed is:

1. A rocker-tricycle combination, comprising:

a rocking base having a curved base plate that rests on a supporting surface and allows rocking motion in a longitudinal direction, the base plate having an upper surface;

a support located on the base plate at the approximate center thereof; and a tricycle detachably connected to the base through the support and aligned longitudinally with the base so that a child can sit on the tricycle and rock back and forth when the tricycle is attached to the base, the tricycle being operable as a conventional tricycle when removed from the base.

2. The rocker-tricycle as defined in claim 1, wherein a trough is provided in the upper surface of the base plate for receiving the rear wheels of the tricycle and retaining the tricycle in alignment with the base.

3. The rocker-tricycle as defined in claim 2, wherein a trough is provided in the upper surface of the base plate for receiving the front wheel of the tricycle so that the front wheel is rotatable when the tricycle is mounted on the base.

4. The rocker-tricycle as defined in claim 1, wherein the tricycle includes a handlebar, a front fork connected thereto and a front wheel carried by the fork, the front wheel being steerable by turning the handlebar when the tricycle is mounted on the support.

5. The rocker-tricycle as defined in claim 4, wherein the handlebar includes a handgrip rotatably attached to an end of the handlebar, the handgrip generating audible noises when rotated.

6. The rocker-tricycle as defined in claim 1, wherein the support includes an upstanding post and the tricycle includes a socket for receiving the post when the tricycle is supported on the base.

7. The rocker-tricycle as defined in claim 1, wherein the tricycle includes a seat pivotally mounted above a cavity on the tricycle, the seat having a seat back detachably mounted on the seat for supporting a child on the tricycle.

8. A rocking-rolling riding toy, comprising:
- a hollow rocking base having top and bottom walls, the bottom wall being curved about a transverse axis for permitting a front and back rocking motion on a supporting surface;
- a pedestal at the approximate center of the base for securing the rolling toy to the base;
- a rolling toy having a hollow frame, a handlebar, and at least three wheels, the toy being detachably supported on the base with the wheels out of contact with the supporting surface when the riding toy is in a rocking mode supported on the base, the hollow frame having upper and lower portions with a socket in the lower portion for alignment with the pedestal when the rolling toy is to be mounted on the base; and
- a connecting device engaging the pedestal and the socket for releasably attaching the rolling toy in a fixed position on the base in the rocking mode.

9. The rocking-rolling riding toy as defined in claim 8, wherein the rolling toy includes a seat movably mounted on the hollow frame, the seat allowing access to the interior of the frame when moved to a first position and prohibiting access to the interior of the frame when moved to a second position.

10. The rocking-rolling riding toy as defined in claim 9, wherein the seat includes a seat back that detachably mounts on the seat to support a child on the rolling toy.

11. The rocking-rolling riding toy as defined in claim 8, wherein the rolling toy includes at least one handle grip rotatably mounted on the handlebar, and a clicking mechanism connected to the at least one grip producing an audible noise when the grip is rotated.

12. The rocking-rolling riding toy as defined in claim 8, wherein the socket is threaded and the connecting device is a screw member rotatably attached to the pedestal for engaging the threaded socket to retain the rolling toy on the base.

13. A rocking-rolling riding toy as defined in claim 8, wherein the rolling toy is a tricycle and the handlebar is connected to one of the wheels for steering the tricycle when detached from the base in a rolling mode.

* * * * *